United States Patent [19]

Huemke et al.

[11] Patent Number: 5,384,386
[45] Date of Patent: Jan. 24, 1995

[54] SYNTHETIC RESINS

[75] Inventors: Klaus Huemke, Friedelsheim; Gerhard Hoffmann, Otterstadt, both of Germany

[73] Assignee: BASF Lacke & Farben AG, Muenster, Germany

[21] Appl. No.: 207,263

[22] Filed: Mar. 8, 1994

Related U.S. Application Data

[63] Continuation of Ser. No. 976,311, Nov. 13, 1992, abandoned.

[30] Foreign Application Priority Data

Nov. 15, 1991 [DE] Germany ............... 4137639

[51] Int. Cl.$^6$ ............................... C08G 65/26
[52] U.S. Cl. ..................... 528/107; 523/415; 523/416
[58] Field of Search ............. 528/107; 523/415, 416

[56] References Cited

U.S. PATENT DOCUMENTS

| | | | |
|---|---|---|---|
| 4,225,479 | 9/1980 | Hicks | 260/29.2 |
| 4,533,682 | 8/1985 | Tortorello et al. | 523/414 |
| 4,594,291 | 6/1986 | Bertram et al. | |
| 4,599,371 | 7/1986 | Loch et al. | 523/402 |
| 4,659,800 | 4/1987 | Daimer et al. | 528/103 |
| 4,725,652 | 2/1988 | Bertram et al. | |
| 4,762,903 | 8/1988 | Geist et al. | 528/107 |
| 4,810,535 | 3/1989 | McCollum et al. | 427/410 |
| 4,824,927 | 4/1989 | Dobbelstein et al. | 528/88 |
| 4,946,817 | 8/1990 | Bertram et al. | |

FOREIGN PATENT DOCUMENTS 0352677  1/1990  European Pat. Off. .

*Primary Examiner*—Melvyn I. Marquis
*Assistant Examiner*—D. Aylward
*Attorney, Agent, or Firm*—Keil & Weinkauf

[57] ABSTRACT

Synthetic resins are based on products which are obtainable by reacting

A) epoxy-carrying resins based on
  $a_1$) polyhydric phenols and
  $a_2$) at least one compound selected from the group consisting of
    $\alpha_1$) polyoxyalkylenepolyols,
    $\alpha_2$) polyoxyalkylenepolyepoxides,
    $\alpha_3$) polyoxyalkylenepolyamines and
    $\alpha_4$) polyhydric aliphatic alcohols and, if desired,
  $a_3$) phenolic compounds which react monofunctionally toward epoxides,
B) monocarboxylic acids of 5 to 30 carbon atoms,
C) amines which contain at least one primary and one tertiary amino group and
D) formaldehyde-donating compounds.

8 Claims, No Drawings

SYNTHETIC RESINS

This application is a cotinuation of application Ser. No. 07/976,311, filed on Nov. 13, 1992, now abandoned.

The present invention relates to synthetic resins based on products which are obtainable by reacting A) epoxy-carrying resins based on
   a$_1$) polyhydric phenols and
   a$_2$) at least one compound selected from the group consisting of
      α$_1$) polyoxyalkylenepolyols,
      α$_2$) polyoxyalkylenepolyepoxides,
      α$_3$) polyoxyalkylenepolyamines and
      α$_4$) polyhydric aliphatic alcohols and,
if desired,
      a$_3$) phenolic compounds which react monofunctionally toward epoxides,
B) monocarboxylic acids of 5 to 30 carbon atoms,
C) amines which contain at least one primary and one tertiary amino group and
D) formaldehyde-donating compounds.

The present invention furthermore relates to aqueous dispersions of these synthetic resins and to pigment formulations which contain the aqueous synthetic resin dispersions. The present invention also relates to the use of the pigment formulations in electrocoating baths.

Synthetic resins which can be prepared using very small amounts of organic solvents and whose low viscosity makes it possible to process them without the addition of solvents are particularly desirable for reasons relating to environmental protection. In order to pigment, for example, coating materials which can be deposited by electrocoating, it is frequently necessary first to grind the pigments finely with a synthetic resin which has surfactant properties, ie. a grinding resin, and then to mix them in the form of this pigment formulation with the other components of the coating material. The grinding resins should very thoroughly wet the pigments so that the latter neither agglomerate nor settle out after a relatively long storage time, even in high concentrations. In addition, the grinding resins should be compatible with the other components of the coating material so that the properties of the coating material are not adversely affected. Moreover, they should have a relatively low viscosity in order to avoid a high solvent content.

Low-solvent grinding resins are disclosed in, for example, EP-A 352 677, but the solvent content of the pigment pastes prepared therefrom is still unsatisfactory.

It is an object of the present invention to provide synthetic resins which, owing to their properties, are particularly suitable for preparation of low-solvent pigment pastes.

We have found that this object is achieved by the synthetic resins defined at the outset.

Component A

Suitable components A are epoxy-carrying resins which may be present, in general, in amounts of from about 30 to 80, in particular from about 50 to 70, % by weight in the synthetic resins. Their average molecular weight $\overline{M}_w$ may be, as a rule, from about 200 to 2,000, preferably from about 600 to 1,500. In general, the epoxy-carrying resins have epoxide equivalent weights of from 100 to 1,000, especially from 300 to 750.

The epoxy-carrying resins are epoxy compounds based on polyhydric phenols, where the basic phenolic epoxide building blocks may be mixed or reacted with polyfunctional polyoxyalkylene derivatives, such as polyoxyalkylenepolyepoxides, -amines and -hydroxides. They may also be reacted with polyhydric aliphatic alcohols. To obtain the required epoxide equivalent weights, these mixtures or reaction products may be reacted with further amounts of polyhydric phenol. Furthermore, a phenolic compound which reacts monofunctionally toward epoxides may be concomitantly used in the preparation of the epoxy-carrying resins.

The basic phenolic epoxy-carrying building blocks generally have epoxide equivalent weights of from 150 to 500, preferably from 150 to 200. They can be obtained, for example, by reacting the polyhydric phenol with an epihalohydrin, preferably epichlorohydrin. Examples of polyhydric phenols are resorcinol, hydroquinone, 2,2-bis-(4-hydroxyphenyl)-propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis-(4-hydroxyphenyl)-ethane, 1,1'-bis-(4-hydroxyphenyl)-isobutane, 2,2-bis-(4-hydroxy-tert-butylphenyl)-propane, bis-(2-hydroxynaphthyl)methane, 1,5-dihydroxynaphthalene, tris-(4-hydroxyphenyl)-methane and 1,1'-bis-(4-hydroxyphenyl) ether. Bisphenol A is the preferred polyhydric phenol here.

The suitable polyoxyalkylene derivatives are polyoxyalkylenepolyols, polyoxyalkylenepolyepoxides or polyoxyalkylenepolyamines or mixtures of these compounds. These polyoxyalkylene derivatives may be linear or branched. Polyoxyalkylene derivatives which have different oxyalkyl groups are also suitable. Polyoxyalkylene derivatives which carry on average two terminal hydroxyl, epoxy or amino groups per molecule are preferred. Examples of suitable polyoxyalkylenepolyols are polyoxyethylene glycol, polyoxypropylene glycol, polyoxybutylene glycol, polyoxyhexamethylene glycol, polyoxymonomethylene glycol, polyoxydecamethylene glycol and polyoxyethylene propylene glycol. The polyfunctional polyoxyalkylenepolyepoxides may be obtained, for example, by reacting the abovementioned polyoxyalkylenepolyols with an epihalohydrin. Polyoxyalkylenepolyamines can be prepared, for example, by a Michael addition of acrylonitrile with a polyoxyalkylenepolyol followed by hydrogenation of the nitrile group, or by direct reaction of the polyoxyalkylenepolyols with ammonia. In the polyfunctional polyoxyalkylene derivatives which are preferably used for the preparation of the novel synthetic resins are polyoxybutylene glycol, polyoxybutyleneamine and polybutylene epoxide.

The average molecular weight of these polyoxyalkylene derivatives is, as a rule, from 400 to 4,000, preferably from 100 to 1,000, the particular equivalent weights generally being from 200 to 2,000, preferably from 400 to 500.

The polyhydric aliphatic alcohols include ethylene glycol, 1,3-propanediol, butanediol, 1,5-pentanediol, hexanediol and 1,2,6-hexanetriol, butanediol and hexanediol being preferred.

In principle, all of the abovementioned polyhydric phenols are suitable for obtaining the epoxide equivalent weight, although the hydroquinone, resorcinol and 1,5-dihydroxynaphthalene, in particular bisphenol A, are preferably used.

The phenolic compound (a₃) which reacts monofunctionally toward epoxides may be phenol itself or advantageously a phenol which carries at least one substituent on the nucleus, selected from the group consisting of $C_1$–$C_{20}$-alkyl, $C_1$–$C_{20}$-alkoxy and $C_2$–$C_{20}$-polyether radicals. The radicals may be linear or branched, linear radicals being preferred, and may be ortho, meta or para to the hydroxyl group of the phenol. For example, methylphenol, ethylphenol, pentylphenol, hexylphenol, dipentylphenol, dihexylphenol, heptylphenol, octylphenol, nonylphenol, decylphenol, dodecylphenol, eicosylphenol, pentyloxyphenol, hexyloxyphenol, dodecyloxyphenol, eicosyloxyphenol, methoxymethylphenol, 5-methoxypentylphenol or ethyl ether diethylene glycol phenol are suitable. Monoalkyl-substituted phenols whose alkyl radicals are of 8 to 18 carbon atoms and are para to the hydroxyl group have proven particularly advantageous. Mixtures of at least two different alkylphenols are very particularly preferred.

Component B

The novel synthetic resins contain a monocarboxylic acid or a mixture of different monocarboxylic acids which are of 5 to 30 carbon atoms and are present in general in amounts of from 5 to 30, preferably from 10 to 20, % by weight. The monocarboxylic acids may be linear or branched, saturated or unsaturated. Examples of suitable monocarboxylic acids are hexanoic acid, 2-ethylhexanoic acid, nonanoic acid, caprylic acid, caproic acid, stearic acid, linoleic acid and linolenic acid. Saturated or unsaturated fatty acids of 10 to 20 carbon atoms are advantageous, those of 15 to 20 carbon atoms being very particularly preferred. Examples are pentadecanoic acid, 9-hexadecanoic acid, palmitic acid, stearic acid, 6-octadecanoic acid, 9-octadecanoic acid (oleic acid), 9,10-octadecadienoic acid, linolenic acid, 9-eicosenoic acid and arachidonic acid.

Component C

According to the invention, the synthetic resins contain an amine which contains at least one primary and at least one tertiary amino group. Aliphatic diamines of 3 to 20 carbon atoms are particularly suitable. The amines may be linear, branched or cyclic, linear diamines being preferred. Examples are N,N-dimethylaminopropylamine, N,N-diethylaminopropylamine, N,N-dimethylaminoneopentylamine, N,N-diethyl-1,4-pentanediamine and 4-amino-1-methylpiperidine. The use of N,N-dimethylaminopropylamine has proven particularly advantageous. The synthetic resins may contain in general from 1 to 20, preferably from 1 to 10, % by weight of these amines.

Component D

A formaldehyde-donating compound, which is concomitantly used according to the invention as component D is, for example, paraformaldehyde or formaldehyde. According to the invention, the synthetic resins contain, as a rule, from 1 to 10, especially from 1 to 5, % by weight of component D.

Component E

The additives which may be present in the novel synthetic resins in general in amounts up to 5% by weight include solvents or solvent mixtures which are inert toward acid, amino and epoxy groups, such as glycol ethers, including propylene glycol phenyl ether and propylene glycol monomethyl ether. However, the additives also include small amounts of polyurethanes and polyvinyl ethers, which serve as leveling agents.

For the preparation of the synthetic resins, epoxy-carrying resins are usually first reacted with the monocarboxylic acids and the amines, if required in the presence of a small amount of a solvent or solvent mixture which is inert toward the functional groups and of a catalyst, the epoxy groups reacting. The catalysts used are compounds such as ethyltriphenylphosphonium bromide, triphenylphosphine, dimethylbenzylamine and triethylamine. In general, they are added in amounts of up to 3, preferably up to 1, % by weight, based on the total weight of component A. Thereafter, the reaction products are further reacted by adding formaldehyde-donating compounds. As a rule, the reaction temperatures for this purpose are from 70° to 100° C. but may be higher or lower, from about 50° to about 150° C. The preferred temperature range is from 80° to 90° C. The reaction times may be from 2 to 10 hours, the endpoint of the reaction being reached on complete formaldehyde conversion.

After they have been protonated by the addition of acids, such as formic acid, acetic acid or lactic acid, or of inorganic acids, such as phosphoric acid, the novel synthetic resins can be dispersed in water. The aqueous dispersions usually contain from 10 to 50% by weight of synthetic resin.

The novel synthetic resins, preferably in the form of their aqueous dispersions, are particularly suitable as grinding resins in pigment formulations. The ratio of synthetic resin to pigment powder depends essentially on the type of pigment or of pigment mixture and on its particle size. Ratios of synthetic resin to pigment powder of from 0.05:1 to 0.8:1, preferably from 0.1:1 to 0.2:1 are possible. In addition to an aqueous dispersion of the synthetic resin, which generally accounts for from 10 to 70% by weight of the pigment formulations, and the pigment powder, which as a rule is present in an amount of from 30 to 80% by weight in the formulations, it is also possible for up to 10% by weight of assistants to be present in the pigment formulations. Examples of assistants are fillers, dispersants, plasticizers and antifoams as well as acrylate-based pigment stabilizers.

Examples of conventional pigments are iron oxides and lead oxides, strontium carbonate, carbon black, titanium dioxide, talc, barium sulfate, cadmium yellow, cadmium red, chromium yellow, phthalocyanine blue or metallic pigments, such as aluminum flakes.

The pigment formulation is usually prepared by mixing the desired amount of dried pigment powder, which contains a pigment or a mixture of different pigments, with the aqueous dispersion of the synthetic resin and then milling the mixture until the solid particles have the desired particle size.

Comminution of the solid particles is effected, as a rule, in ball mills, sand mills, Cowles dissolvers or continuous milling apparatuses. After comminution, the particle size of the solid particles should be 10 μm or smaller. Finenesses of 3 μm or less can be achieved by milling in the presence of glass, corundum, ceramic or zirconium dioxide beads.

The pigment formulations thus obtained can be mixed with surface coating binders. Particularly suitable binders are those which are compatible with the synthetic resins of the pigment pastes. These include in particular water-dispersible binders which are based on epoxy resins and can be used in electrocoating baths. Usually, the ratios of pigment formulation to binder are from 0.1:1 to 0.8:1, preferably from 0.2:1 to 0.5:1. The mixtures of pigment formulation and binder may contain crosslinking agents and assistants as further components. The electrocoating is carried out in general by known methods, and all electrically conductive substrates, for example metal, such as steel, copper or aluminum, may be coated. After the coating procedure, the coatings may be cured at elevated temperatures which in general depend on the crosslinking agent.

The novel pigment formulation have low pigment contents and high stability. Coatings which contain these pigment formulations exhibit excellent corrosion protection, in particular at edges, even when the pigment formulations contain no lead salts.

EXAMPLES

Abbreviations
EEW: Epoxide-equivalent weight
BPA: Bisphenol A [2,2-bis-(4-hydroxyphenyl)-propane]
DEAPA: Diethylaminopropylamine
PFA: Paraformaldehyde
DDPh: Dodecylphenol
NPh: Nonylphenol
TPP: Triphenylphosphine
DE: Demineralised

I) Preparation of the Novel Synthetic Resins

General Method

The components of the epoxy-carrying resins (component A) were heated to about 130° C., and the stated amount of catalyst was added. This temperature was then maintained until the desired epoxide equivalent weight (EEW) had been reached, cooling being required during the highly exothermic reaction. The viscosity was brought to the desired range by adding a solvent. The monocarboxylic acid (component (B)) was first added within one hour, followed by the amine (component (C)), the reaction temperature being kept at 80° C., if necessary with cooling. After the epoxide value had decreased to 0, the stated amount of paraformaldehyde was added and the reaction mixture was stirred at from 80° to 90° C. until complete conversion of the formaldehyde. The synthetic resin thus obtained was filled into containers while still warm.

| Synthetic resin 1: | |
|---|---|
| Initially taken mixture | 1082.9 g of diglycidyl ether based on BPA, EEW = 188 |
| | 132.2 g of polyoxybutylene diglycidyl ether, EEW = 415 |
| | 342.0 g of BPA |
| | 130.9 g of DDh |
| | 110.2 g of NPh |
| | 94.6 g of propylene glycol phenyl ether |
| Catalyst | 1.1 g of TPP |
| EEW | 750 |
| Feed I | 271.9 g of propylene glycol monomethyl ether |
| Feed II | 337.4 g of linoleic acid |
| | 156.9 g of DEAPA |
| Feed III | 72.3 g of PFA |
| Solids content | 85.3% |
| Amine number | 58 mg of KOH/g |
| Synthetic resin 2: | |
| Initially taken mixture | 1082.9 g of diglycidyl ether based on BPA, EEW = 188 |
| | 132.2 g of polyoxybutylene diglycidyl ether, EEW = 415 |
| | 285.0 g of BPA |
| | 261.9 g of DDh |
| | 94.6 g of propylene glycol phenyl ether |
| Catalyst | 0.9 g of TPP |
| EEW | 600 |
| Feed I | 218.2 g of propylene glycol monomethyl ether |
| Feed II | 193.4 g of DEAPA |
| | 415.8 g of linoleic acid |
| Feed III | 89.1 g of PFA |
| Solids content | 85.6% |
| Amine number | 69 mg of KOH/g |
| Synthetic resin 3: | |
| Initially taken mixture | 842.3 g of diglycidyl ether based on BPA, EEW = 188 |
| | 396.5 g of polyoxybutylene diglycidyl ether, EEW = 415 |
| | 342.0 g of BPA |
| | 130.9 g of DDh |
| | 110.2 g of NPh |
| | 95.6 g of propylene glycol phenyl ether |
| Catalyst | 0.4 g of TPP |
| EEW | 750 |
| Feed I | 104.8 g of propylene glycol monomethyl ether |
| Feed II | 162.1 g of DEAPA |
| | 348.6 g of linoleic acid |
| Feed III | 74.7 g of PFA |
| Solids content | 90.6% |
| Amine number | 59 mg of KOH/g |
| Synthetic resin 4: | |
| Initially taken mixture | 842.3 g of diglycidyl ether based on BPA, EEW = 188 |
| | 396.5 g of polyoxybutylene diglycidyl ether, EEW = 415 |
| | 342.0 g of BPA |
| | 261.9 g of DDh |
| | 97.0 g of propylene glycol phenyl ether |
| Catalyst | 1.08 g of TPP |
| EEW | 750 |
| Feed I | 107.4 g of propylene glycol monomethyl ether |
| Feed II | 158.8 g of DEAPA |
| | 341.6 g of linoleic acid |
| Feed iii | 73.2 g of PFA |
| Solids content | 91.8% |
| Amine number | 57 mg of KOH/9 |
| Synthetic resin 5: | |
| Initially taken mixture | 842.3 g of diglycidyl ether based on BPA, EEW = 188 |
| | 396.5 g of polyoxybutylene diglycidyl ether, EEW = 415 |
| | 285.0 g of BPA |
| | 261.9 g of DDh |
| | 94.0 g of propylene glycol phenyl ether |
| Catalyst | 0.9 g of TPP |
| EEW | 600 |
| Feed I | 96.4 g of propylene glycol monomethyl ether |
| Feed II | 183.6 g of DEAPA |
| | 394.8 g of linoleic acid |
| Feed III | 84.6 g of PFA |
| Solids content | 92.1% |
| Amine number | 66 mg of KOH/g |
| Synthetic resin 6: | |
| Initially taken mixture | 805.4 g of diglycidyl ether based on BPA, EEW = 188 |
| | 379.2 g of polyoxybutylene diglycidyl ether, EEW = 415 |
| | 205.2 g of BPA |
| | 117.8 g of DDh |
| | 99.2 g of NPh |
| | 42.6 g of propylene glycol phenyl ether |
| Catalyst | 0.5 g of TPP |
| EEW | 475 |
| Feed I | 89.7 g of propylene glycol monomethyl ether |
| Feed II | 222.6 g of DEAPA |
| | 478.8 g of linoleic acid |
| Feed III | 102.6 g of PFA |
| Solids content | 94.8% |

| | | |
|---|---|---|
| -continued | | |
| Amine number | 81 mg of KOH/g | |

II) Preparation of the Novel Pigment Formulations

General Method

The synthetic resins were mixed with lactic acid in the stated amounts and diluted with half the stated amount of DE water. The stated amounts of the pigments were then added. The mixture was milled in a stirred ball mill to a Hegman fineness of <7. It was then diluted with the remaining amount of DE water.

| | | |
|---|---|---|
| Formulation 1: | Synthetic resin 1: | 113.5 g |
| | Titanium dioxide: | 344.0 g |
| | Lead silicate: | 42.6 g |
| | Bead black: | 6.5 g |
| | Lactic acid: | 7.2 g |
| | DE water: | 400.7 g |
| Formulation 2: | Synthetic resin 2: | 113.1 g |
| | Titanium dioxide: | 344.0 g |
| | Lead silicate: | 42.6 g |
| | Bead black: | 6.5 g |
| | Lactic acid: | 8.6 g |
| | DE water: | 405.6 g |
| Formulation 3: | Synthetic resin 3: | 106.8 g |
| | Titanium dioxide: | 344.0 g |
| | Lead silicate: | 42.6 g |
| | Bead black: | 6.5 g |
| | Lactic acid: | 7.3 g |
| | DE water: | 401.7 g |
| Formulation 4: | Synthetic resin 4: | 115.4 g |
| | Titanium dioxide: | 344.0 g |
| | Lead silicate: | 42.6 g |
| | Bead black: | 6.5 g |
| | Lactic acid: | 7.1 g |
| | DE water: | 400.7 g |
| Formulation 5: | Synthetic resin 5: | 105.1 g |
| | Titanium dioxide: | 344.0 g |
| | Lead silicate: | 42.6 g |
| | Bead black: | 6.5 g |
| | Lactic acid: | 8.2 g |
| | DE water: | 399.4 g |
| Formulation 6: | Synthetic resin 6: | 102.1 g |
| | Titanium dioxide: | 344.0 g |
| | Lead silicate: | 42.6 g |
| | Bead black: | 6.5 g |
| | Lactic acid: | 10.1 g |
| | DE water: | 395.1 g |
| Formulation 7: | Synthetic resin 7: | 101.1 g |
| | Titanium dioxide: | 272.0 g |
| | Aluminum silicate: | 79.2 g |
| | Chalk: | 35.4 g |
| | Bead black: | 6.5 g |
| | Lactic acid: | 10.1 g |
| | DE water: | 395.1 g |

III) Preparation of a Binder/Crosslinking Agent Dispersion a) Preparation of the Amidoamine Intermediate 246 g of hexamethylenediamine, 307 g of a dimeric fatty acid, 59 g of linoleic acid and 39 g of xylene were heated to 190° C. and 57 g of a mixture of water of reaction and xylene were distilled off azeotropically. Dilution was effected with 66 g of xylene. A further 4.1 g of hexamethylenediamine were then added. The amine number of the product was 249 mg of KOH/g and the acid number was 1.6 ml of KOH/g.

b) Preparation of the Binder 248 g of a tetrafunctional glycidyl ether based on bisphenol A and having an epoxide equivalent weight of from about 180 to 190, 220 g of nonylphenol and 25 g of phenoxypropanol were heated to 130° C. while stirring. 0.12 g of triphenylphosphine was added and the reaction was allowed to continue until the epoxide equivalent weight was 477. The mixture was diluted with 176 g of a solvent mixture of isobutanol and butylglycol (weight ratio 9:1) and was cooled to 60° C. 30 g of methyl-ethanolamine was added dropwise and the reaction was allowed to continue for a further 10 minutes. 141.3 g of the amidoamine intermediate and 53 g of a 9:1 isobutanol/butylglycol mixture were then added. The temperature was kept at 80° C. for a further 2 hours. Solids content: 68.2% by weight; amine number: 180.5 g of KOH/g.

c) Preparation of the crosslinking agent 504 g of trimerized hexamethylene diisocyanate were dissolved in 382 g of toluene. 388 g of dibutylamine were added dropwise at 70° C. while cooling. Stirring was continued until the isocyanate value was close to zero.

d) Preparation of the Binder/Crosslinking Agent Dispersion 872 g of the binder were thoroughly mixed with 364 g of the crosslinking agent and 28.7 g of acetic acid. 1,193 g of water was slowly added dropwise to the mixture while stirring.

IV) Comparative Pigment Formulations a) Preparation of a Comparative Grinding Resin 640 parts of a diglycidyl ether based on bisphenol A and epichlorohydrin and having an epoxide equivalent weight of 485 and 160 parts of such an ether having an epoxide equivalent weight of 189 were mixed at 100° C. In a further vessel, 452 parts of hexamethylenediamine were initially taken and heated to 100° C., and 720 parts of the above hot epoxy resin mixture were added in the course of one hour, gentle cooling being required in order to keep the temperature at 100° C. After a further 30 minutes, the excess hexammethylenediamine was stripped off with an increase in temperature and under reduced pressure, a temperature of 205° C. and a pressure of 30 mbar being reached at the end. 57.6 parts of stearic acid, 172.7 parts of a dimeric fatty acid and 115 parts of xylene were then added. The water formed was then distilled off azeotropically in the course of 90 minutes at from 175° to 180° C. 58 parts of butylglycol and 322 parts of isobutanol were then added. The product had a solids content of 70% and a viscosity of 2,240 mPa.s, measured at 75° C. using a plate-and-cone viscometer.

b) Preparation of the Comparative Pigment Formulation (V1)

168.7 g of butylglycol, 600 g of water and 17.7 g of acetic acid were added to 525.8 g of the grinding resin. 800 g of titanium dioxide, 11.0 g of carbon black and 50 g of basic lead silicate were then added and milling was carried out in a ball mill to a particle size of less than 9 μm. The solids content was brought to 48% by weight with water.

c) Preparation of the Comparative Pigment Formulation (V2)

The comparative pigment formulation (V2) was prepared using the comparative grinding resin corresponding to the general method for the preparation of novel formulations 1 to 7. To obtain a coat thickness of 22 μm, it was necessary to add a further 12 ml of propylene glycol per liter of electrocoating bath.

| Comparative pigment formulation (V2): | |
| --- | --- |
| Comparative grinding resin: | 138.3 g (= 96.4 g solids content) |
| Titanium dioxide: | 344.0 g |
| Lead silicate: | 42.6 g |
| Bead black: | 6.5 g |
| Lactic acid: | 11.2 g |
| DE water: | 371.9 g |

V) Preparation of the Electrocoating Baths 676 g -of one of the abovementioned pigment formulations were added to 1,980 g of the binder/crosslinking agent dispersion. The mixtures were thoroughly mixed and were brought to a total weight of 5,000 g with DE water. The solids content of the baths was about 20%. Coating of the metal sheets for the performance tests was carried out after the baths had been stirred for 7 days at 30° C.

VI) Performance Tests

Coatings were deposited at a voltage of from 220 to 350 V and at 27° C. from the electrocoating baths onto zinc-phosphatized steel sheets measuring 190×105 mm in the course of 2 minutes. These coatings were cured at 165° C. The thickness of the resulting coatings was from 22 to 25 μm. The coated steel sheets were then subjected to the performance tests. The results are shown in the Table.

TABLE

| Electro-coating dispersion No. | Pigment formulation No. | U [V] | EC [mm] | RI [Nm] | DBE(−) [mm$^2$/R] | CCT UM/A/E [mm] | Solvent content [%] |
| --- | --- | --- | --- | --- | --- | --- | --- |
| 1 | 1 | 280 | 6.9 | 9.1 | 6.1/3 | 1.6/1/3 | 0.35 |
| 2 | 2 | 320 | 7.0 | 11.3 | 5.8/3 | 1.5/1/3 | 0.35 |
| 3 | 3 | 300 | 8.2 | 15.8 | 5.1/2 | 1.4/0/2 | 0.27 |
| 4 | 4 | 290 | 8.3 | 18.1 | 5.0/2 | 1.5/0/2 | 0.23 |
| 5 | 5 | 330 | 8.1 | 18.1 | 4.2/1 | 1.3/0/1 | 0.24 |
| 6 | 6 | 350 | 8.8 | >18.8 | 3.1/1 | 1.3/0/1 | 0.22 |
| 7 | 7 | 240 | 8.6 | >18.6 | 4.0/1 | 2.5/0/3 | 0.22 |
| Comparison | V1 | 220 | 4.9 | <1.1 | 13.7/5 | 2.2/2/5 | 1.85 |
| Comparison | V2 | 240 | 5.1 | <1.1 | 12.1/5 | 2.0/2/5 | 1.64 |

U: Deposition voltage, measured in [V]
EC: Erichsen cupping, measured in [mm]
RI: Reverse impact, determined with a mandrel impact tester from Gardner according to ASTM D 2794
DBE: Daimler-Benz individual stone chip test at a test temperature of −20° C., DIN 55,995, Method A; Erichsen Technical Description Model 490 (1981)
R: Degree of rusting 0 (no rust)—5 (severely rusted)
CCT: 10 cycles in climate cycling test according to VDA 621-415
UM: Undermigration at the crack, measured in [mm]
A: Rusting over surface area 0 (no rust)—5 (severely rusted)
E: Rusting at edge 0 (no rust)—5 (severely rusted)
The solvent content relates to the fresh bath and is stated in % by weight, based on the total weight of the bath.

We claim:

1. A synthetic resin comprising products which are obtained by first reacting
A) epoxy-carrying resins obtained by mixing or reacting
   a1) a polyhydric phenol which is a phenolic epoxy carrying building block with an epoxide equivalent weight of from 150 to 500 with
   a2) at least one compound selected from the group consisting of
      $\alpha_1$) polyoxyalkylenepolyols
      $\alpha_2$) polyoxyalkylenepolyepoxides
      $\alpha_3$) polyoxyalkylenepolyamines and
      $\alpha_4$) polyhydric aliphatic alcohols
and optionally reacting these mixtures or reaction products with
   a3) phenolic compounds which react monofunctionally towards epoxides
with
B) monocarboxylic acids of 5 to 30 carbon atoms
and
C) amines which contain at least one primary and one tertiary amino group
and thereafter reacting the reaction product of A), B) and C) with
D) formaldehyde-donating compounds.

2. A synthetic resin as defined in claim 1, based on products which are obtained by reacting
A) from 30 to 80% by weight of epoxy-carrying resins based on
   a1) polyhydric phenols and
   a2) at least one compound selected from the group consisting of the
      $\alpha_1$) polyoxyalkylenepolyols,
      $\alpha_2$) polyoxyalkylenepolyepoxides,
      $\alpha_3$) polyoxyalkylenepolyamines and
      $\alpha_4$) polyhydric aliphatic alcohols and,
optionally,
   a3) phenolic compounds which react monofunctionally toward epoxides,
B) from 10 to 30% by weight of monocarboxylic acids of 5 to 30 carbon atoms,
C) from 5 to 20% by weight of amines which contain at least one primary and one tertiary amino group,
D) from 1 to 10% by weight of a formaldehyde-donating compound and
E) from 0 to 5% by weight of additives,
the components (A) to (E) summing to 100% by weight.

3. A synthetic resin as defined in claim 1, wherein the component (A) is an epoxy-carrying resin based on bisphenol A, a polyoxyalkylenepolyepoxide and a phenol which carries at least one substituent in the nucleus, selected from the group consisting of $C_1$–$C_{20}$-alkyl, $C_1$–$C_{20}$-alkoxy and $C_1$–$C_{20}$-polyether radicals.

4. A synthetic resin as defined in claim 1, wherein the component (C) is dimethylaminopropylamine.

5. An aqueous dispersion containing from 10 to 50% by weight of a synthetic resin as defined in claim 1.

6. A pigment formulation containing, as essential components,
   a) an aqueous dispersion as defined in claim 5,
   b) a pigment powder and,
   if desired,
   c) assistants.

7. A process for the preparation of a pigment formulation, wherein
   a) from 10 to 70% by weight of an aqueous dispersion as claimed in claim 5,
   b) from 30 to 60% by weight of a pigment powder and
   c) from 0 to 10% by weight of assistants
are mixture, the components (a) to (c) summing to 100% by weight.

8. A process for the preparation of the aqueous dispersion of claim 5, which comprises protonating the synthetic resin and dispersing the protonated resin in water.

* * * * *